(12) United States Patent
Day

(10) Patent No.: US 6,801,702 B2
(45) Date of Patent: Oct. 5, 2004

(54) ELECTRO-OPTIC DEVICE

(75) Inventor: Ian Edward Day, Headington (GB)

(73) Assignee: Bookham Technologies PLC, Oxfordshire (GB)

( * ) Notice: Subject to any disclaimer, the term of this patent is extended or adjusted under 35 U.S.C. 154(b) by 169 days.

(21) Appl. No.: 09/874,999

(22) Filed: Jun. 7, 2001

(65) Prior Publication Data

US 2002/0126976 A1 Sep. 12, 2002

(30) Foreign Application Priority Data

Aug. 11, 2000 (GB) .............................................. 0019771

(51) Int. Cl.[7] .................................................. G02B 6/10
(52) U.S. Cl. ...................................... 385/130; 385/129
(58) Field of Search .................................. 358/129, 130, 358/5, 6, 8; 385/2, 8, 3, 129, 130, 131

(56) References Cited

U.S. PATENT DOCUMENTS

| | | | |
|---|---|---|---|
| 4,145,121 A | 3/1979 | Hata et al. .................... 350/355 |
| 4,624,000 A | * 11/1986 | Streifer et al. ................. 372/45 |
| 4,701,774 A | * 10/1987 | McIlroy et al. ................ 257/13 |
| 4,758,092 A | * 7/1988 | Heinrich et al. ............. 356/364 |
| 4,877,299 A | * 10/1989 | Lorenzo et al. ................. 385/3 |
| 4,904,039 A | 2/1990 | Soref ....................... 350/96.14 |
| 4,958,898 A | * 9/1990 | Friedman et al. ............... 385/3 |
| 4,997,246 A | * 3/1991 | May et al. ....................... 385/2 |
| 5,008,893 A | * 4/1991 | Amann et al. ................ 372/50 |
| 5,349,599 A | * 9/1994 | Larkins ........................ 372/50 |
| 5,755,986 A | 5/1998 | Yamamoto et al. ....... 252/62.54 |
| 5,757,986 A | * 5/1998 | Crampton et al. .............. 385/2 |
| 5,821,570 A | 10/1998 | Kazmierski et al. .......... 257/97 |
| 5,908,305 A | * 6/1999 | Crampton et al. .......... 438/141 |
| 6,298,177 B1 | * 10/2001 | House ............................ 385/3 |
| 6,301,037 B1 | * 10/2001 | Fischer et al. .............. 359/180 |

FOREIGN PATENT DOCUMENTS

| | | | | |
|---|---|---|---|---|
| DE | 3600458 A1 | 7/1986 | | |
| GB | 2230616 A | 10/1990 | | |
| GB | 2265252 A | * 3/1992 | ........... H01L/29/06 |
| GB | 2333851 A | 8/1999 | | |
| WO | WO 00/10039 | 2/2000 | | |

* cited by examiner

*Primary Examiner*—Frank G. Font
*Assistant Examiner*—Kaveh C Kianni
(74) *Attorney, Agent, or Firm*—Fleshner & Kim, LLP (57) ABSTRACT

An electro-optic device is disclosed for altering the density of charge carriers within an integrated optical waveguide. The device includes a substrate, and an integrated optical waveguide extending across the substrate with two doped regions being provided such that an electrical signal can be applied across the doped regions to alter the density of charge carriers within the waveguide. The doped regions can each include a plurality of doped areas spaced apart from each other along the length of the waveguide.

16 Claims, 8 Drawing Sheets

ELECTRO-OPTIC DEVICE

FIELD OF THE INVENTION

This invention relates to an electro-optic device for altering the density of charge carriers within an integrated optical waveguide. Such a device may be used as an attenuator or in applications which make use of the change in refractive index caused by the charge carriers, e.g. as a phase modulator in a Mach-Zehnder interferometer.

BACKGROUND OF THE INVENTION

It is known to form an attenuator or phase modulator in the form of a lateral p-i-n diode across an integrated optical waveguide. Examples of such devices are described in U.S. Pat. No. 5,755,986, GB2333851A and WO00/10039, the disclosures of which are incorporated herein. Such devices may be also be used in a wide variety of other applications.

SUMMARY OF THE INVENTION

The present invention aims to provide an improvement of such devices.

According to a first aspect of the invention, there is provided an electro-optic device comprising a substrate, an integrated optical waveguide extending across the substrate, and means arranged to apply an electrical signal across the waveguide via two doped regions to alter the attenuation properties and/or the refractive index of the waveguide by altering the density of charge carriers within the waveguide, the two doped regions each comprising a plurality of doped areas spaced apart from each other in a direction parallel to the length of the waveguide the size and spacing of the doped areas being selected so that the efficiency of the device, in terms of the increase in attenuation or change in refractive index per unit current applied thereto, is increased.

According to a second aspect of the invention, there is provided an electro-optic device comprising a substrate and an integrated optical waveguide extending across the substrate, wherein the waveguide comprises a series of two or more curved portions curving in alternating directions, each having an n-doped region adjacent the outer side of the curved portions and a p-doped region on the inner side thereof so as to form a series of diodes of alternating polarity along the length of the waveguide.

This second aspect of the invention enables a diode to be formed in a curved portion of a waveguide, which may be used in conjunction with the first aspect of the invention.

Preferred and optional features of the invention will be apparent from the following description and from the subsidiary claims of the specification.

BRIEF DESCRIPTION OF THE DRAWINGS

The invention will now be further described, merely by way of example, with reference to the accompanying drawings, in which.

Figure 1:
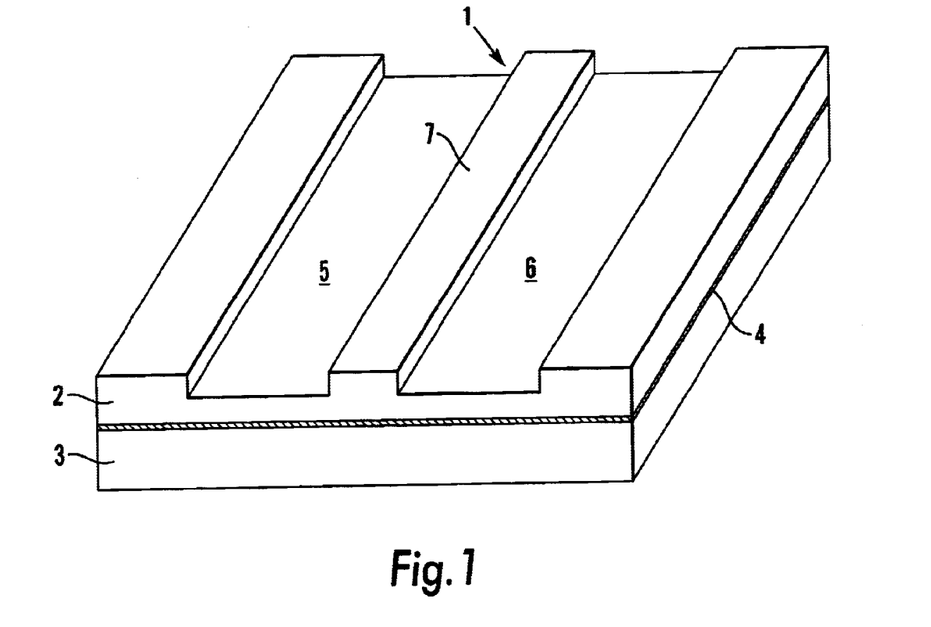
FIG. 1 is a perspective view of a known form of rib waveguide formed in a silicon-on-insulator (SOI) chip.

FIG. 1 shows a rib waveguide 1 formed in an SOI chip comprising a silicon layer 2 separated from a substrate 3, which may also be of silicon, by an insulating layer 4, which is typically formed of silicon dioxide. The rib waveguide 1 is formed by etching trenches 5 and 6 in the silicon layer 2 to leave a rib 7 therebetween.

DETAILED DESCRIPTION OF THE INVENTION

Figure 2:
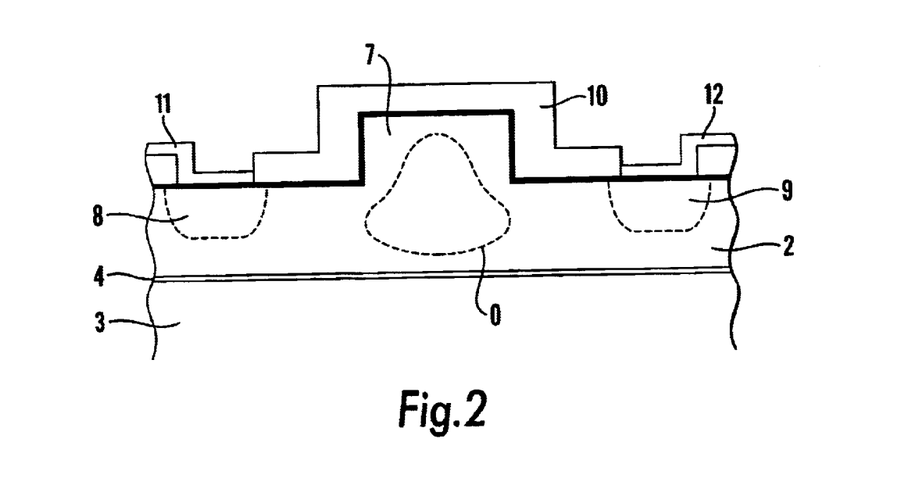
FIG. 2 is a cross-sectional view through a waveguide such as that shown in FIG. 1 with a lateral p-i-n diode formed across the waveguide by providing p and n-doped regions on opposite sides of the waveguide.

A p-i-n diode may be formed across the rib waveguide 1 as shown in FIG. 2 by providing a p-doped region 8 adjacent one side of the waveguide and an n-doped region adjacent the other side of the waveguide. The regions 8 and 9 may be formed by doping the bottom surfaces of the trenches 5 and 6. In an alternative arrangement (not shown), the p-doped region may be formed in one side face of the rib 7 and an n-doped region 9 in the other side face of the rib 7. In another arrangement, one doped region may be provided on a top or side surface of the rib 7 and the other adjacent one or both sides of the waveguide. Examples of such arrangements are shown in GB2333851A. The optical mode O is shown by dashed lines in FIG. 2.

FIG. 2 also shows an oxide layer 10 formed over the rib 7 and electrical contacts 11 and 12, e.g. metallisations, for applying a voltage across the p-i-n diode thus formed.

Figure 3:
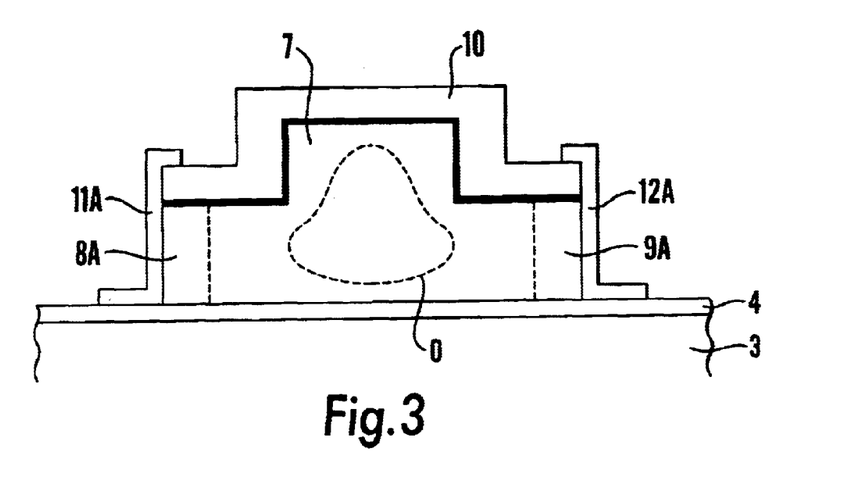
FIG. 3 is a cross-sectional view of another form of p-i-n diode formed across such a waveguide.

FIG. 3 shows an alternative form of device in which the silicon layer on each side of the rib 7 is etched away down to the oxide layer 4. The n and p-doped regions 8A and 9A are then formed in the side surfaces of the remaining portion of silicon. Electrical contacts 11A and 12A are again shown.

In known devices such as those described above, the doped regions extend along a length of the waveguide for a distance sufficient to provide the required effect. For example, in an attenuator, the doped regions typically extend along the waveguide by a distance of 10 mm.

However, it has been discovered that the performance of such a device can be improved by forming each of the doped regions as a plurality of doped areas spaced from each other along the length of the waveguide. This is based on the realisation that although attenuation or refractive index change due to the presence of the charge carriers increases as the current rises, due to the increase in the number of charge carriers injected into the waveguide, the rate of the increase begins to fall off as scattering of the charge carriers due to their increased numbers also rises.

Figure 4:
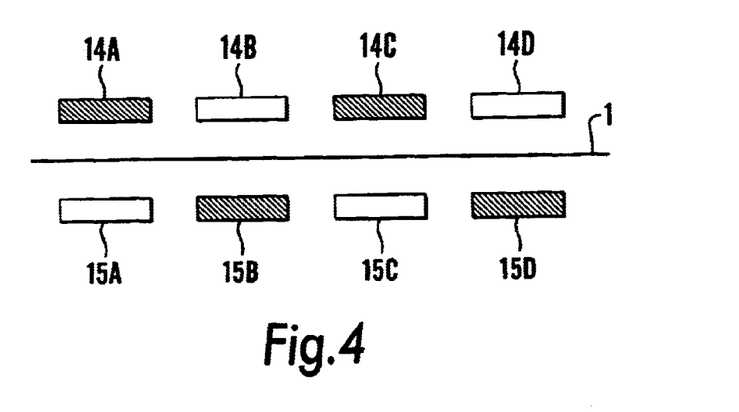
FIG. 4 is a plan view of a rib waveguide with doped regions provided on opposite sides thereof according to one embodiment of the invention to form an attenuator.

FIG. 4 is a plan view of one embodiment of the present invention showing a substantially straight portion of a rib waveguide 1 with doped regions on each side thereof divided into four separate areas, 14A, 14B, 14C and 14D on one side of the waveguide and 15A, 15B, 15C and 15D on the other side of the waveguide 1. The doped areas on one side may all be p-doped and the doped areas on the other side all n-doped but, for reasons which will be explained below, it is preferred that they alternate, so that, for example, areas 14B, 14D, 15A and 15C are p-doped and areas 14A, 14C, 15B and 15D are n-doped.

Figure 7:
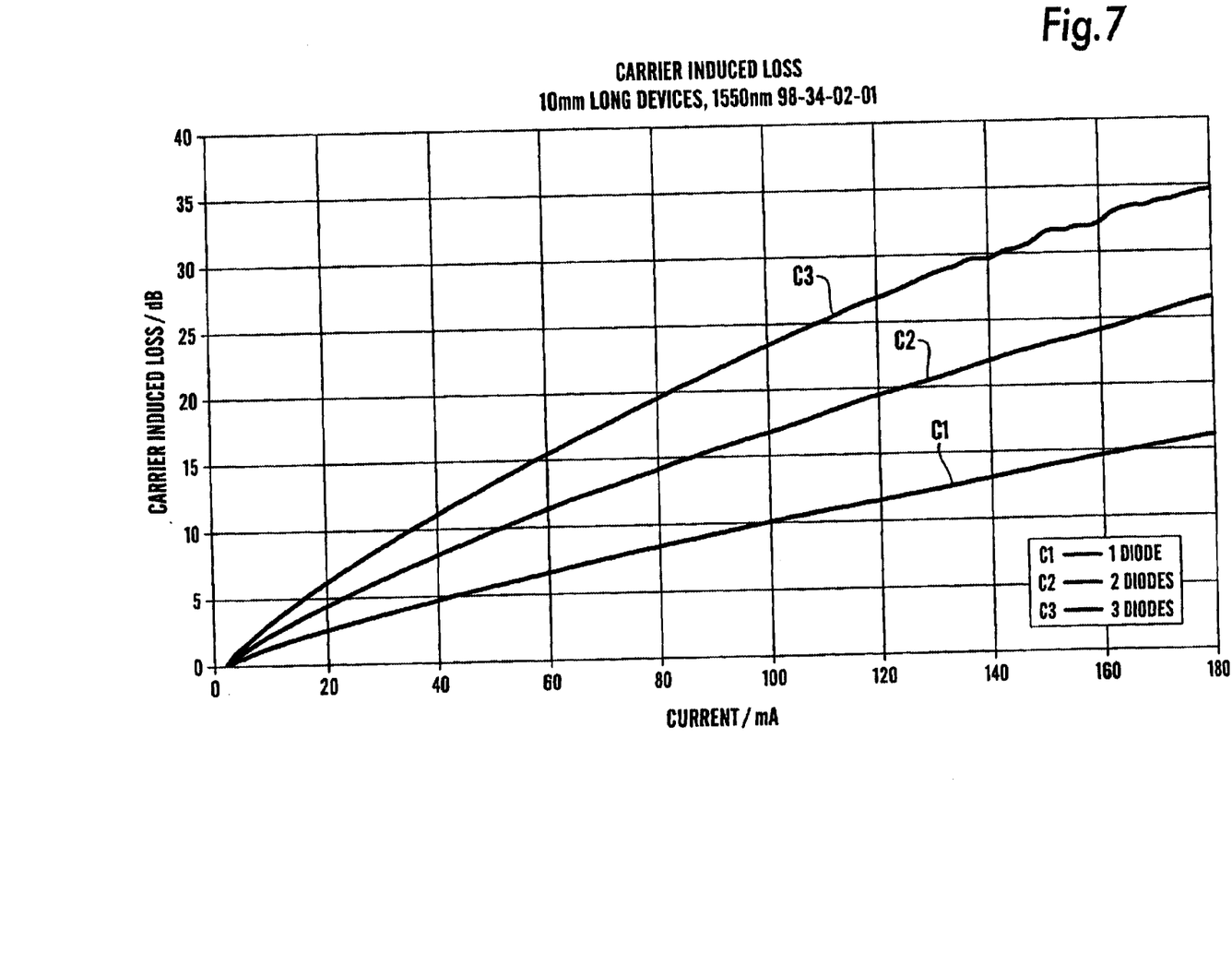
FIGS. 7, 8, 9 and 10 are graphs of the performance of various types of device for use in explaining the advantages of the present invention.

FIG. 7 shows graphs of carrier induced losses, i.e. attenuation, against the current applied to a p-i-n diode for a device, having a total length of 10 mm, comprising a single pair of doped areas (each 10 mm long), curve C1, for a device comprising two pairs of doped areas (each approximately 5 mm long), curve C2, and for a device comprising three pairs of doped areas (each approximately 3.3 mm long), curve C3. Each of these curves shows that the losses increase as the current increases but that the device is more efficient, in terms of the increase in attenuation per unit current, at lower currents (where the slope of the curve is greater). The curves also show that the device becomes more efficient as the number of pairs of doped areas increases from one to two and from two to three. This is due to the lower level of current between the doped areas in each pair as the number of pairs increases. Typically, power efficient attenuation characteristics of 20 dB have been obtained at around 225 mW.

Figure 8:
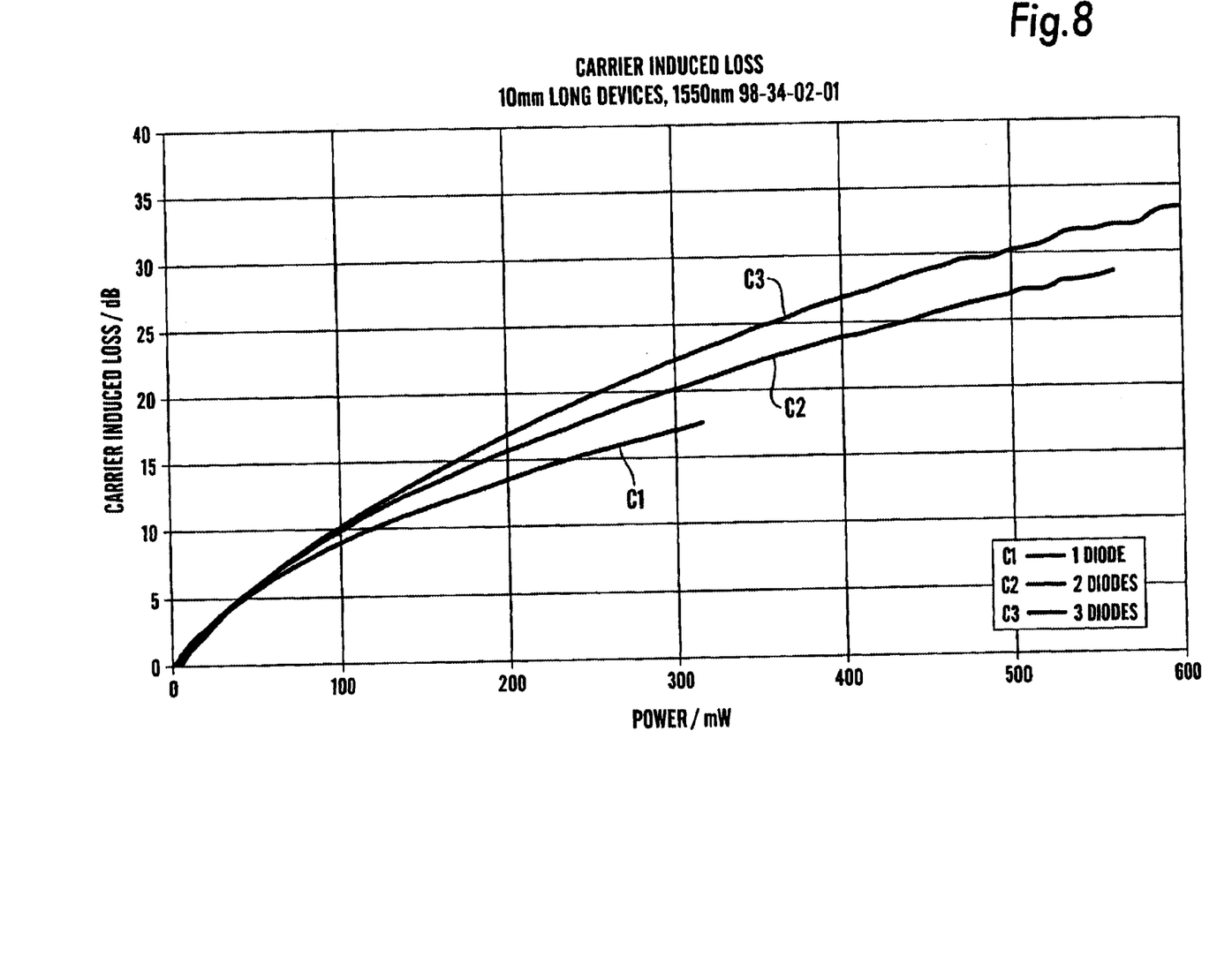

FIG. 8 shows similar curves for carrier induced loss against power applied. The results are similar except that the differences between the devices are less pronounced.

Figure 9:
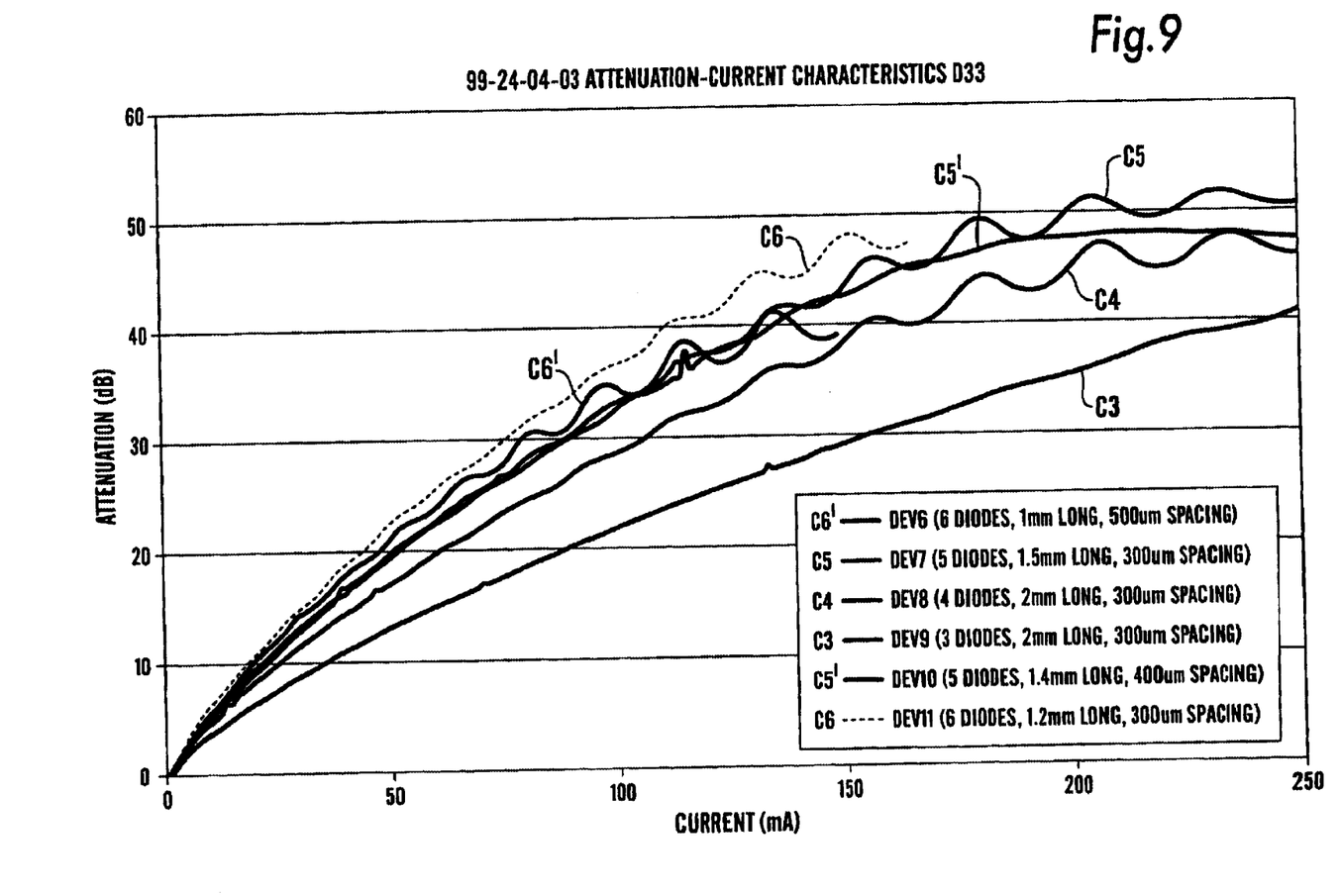
Figure 10:
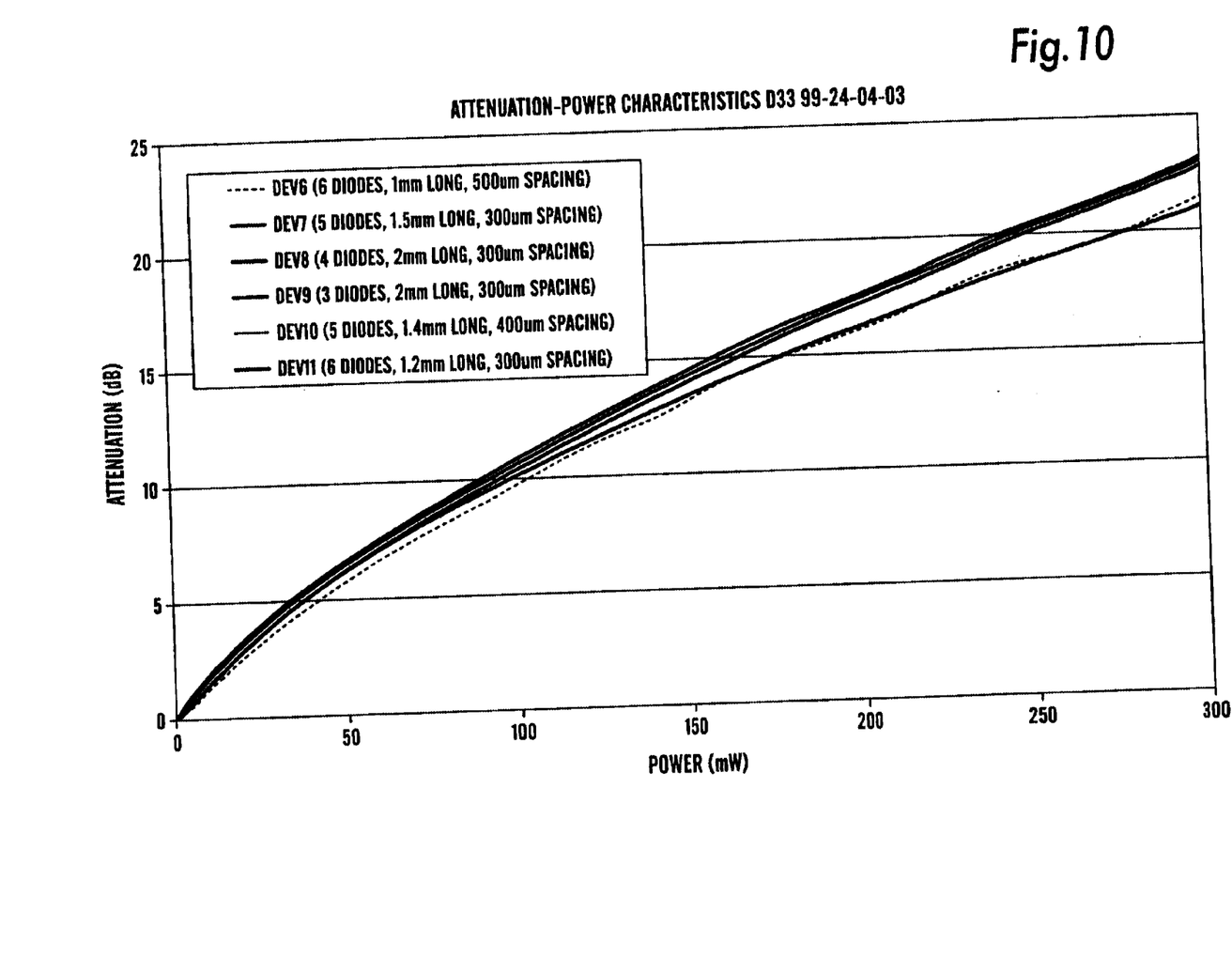

FIGS. 9 and 10 show corresponding curves C3, C4, C5 and C6 for devices having three, four, five and six pairs of doped regions with a 300 micron spacing between adjacent areas, for five pairs with a 400 micron spacing (curve C5') and for six pairs with a 500 micron spacing (curve C6'). These show that the efficiency of the attenuator increases as the number of paired regions increases. However, as the number of regions increases, the increase in efficiency per additional pair becomes less as the total length of doped area reduces due to the increased number of spaces between the doped areas.

The spacing between adjacent doped areas cannot be too small otherwise current leaks between adjacent areas so they act more like a single area (as in the prior art). But if the spacing is too large, the advantage of using a greater number of doped areas is outweighed by the reduction in the total area which is doped.

The number of separate doped area provided along the length of the waveguide will be determined by the application and the device may comprise two, three, four, five, six or more such areas.

The optimum number of doped areas and the optimum spacing therebetween will depend on the size and the type of device, but for an attenuator having a total length of about 10 mm it is found that the optimum number of areas is four, as shown in FIG. 4, and the optimum spacing between adjacent areas is in the. range 250 to 300 microns. Thus, each of the four areas has a length of approximately 2.5 mm.

For devices of other lengths, e.g. with a total length of 20 mm, the optimum number of areas can be determined by carrying out trials to produce curves corresponding to those of FIGS. 7 to 10. However, each area preferably has a length of at least 1 mm and preferably no greater than 10 mm.

In theory, the number of diode sections that an attenuator of a given length is divided into should not make any difference to the overall power of consumption. Splitting an active length into two will halve the length of the diode section and thus halve the current required to attain a given current density. However, the doubling of the number of diodes will lead to a doubling of the total drive voltage, so that the current-voltage product should remain constant. In this ideal case, the choice of the number of diodes used is simply a matter of deciding whether to operate the device at high voltage or high current.

In a real device, however, the power of efficiency may be a function of the number of diode sections. For example, it is known that the current is not well confined and leakage of current between diode section along stray paths (i.e. paths not overlapping with the waveguide) may compromise the power efficiency. In this situation, the spacing of the diode sections along the direction of the waveguide becomes important. The size of the spacing is ultimately limited by the available chip length and so the number of diode sections will also be limited by the available chip length and so the number of diode sections will also be limited if a given active length is to be maintained. Alternatively, a large number of diode sections may help to improve the uniformity of the distribution of current flow through the waveguide. If the longitudinal doping profile of the p-i-n diode is non-uniform, then there may be a tendency for the current to filament, i.e. be concentrated along narrow paths, thus reducing the effective interaction length of the charge carriers with the optical mode in the waveguide. Division of the active length into multiple diode sections reduces the possibility of this happening since the current channel is effectively narrowed. Another point to consider when choosing the number of diode sections is that an even number of sections is preferable since any diode non-uniformity will be compensated for by passing the same total current in both lateral directions across the waveguide. It is known that there is a small lateral gradient to the free carrier density in the waveguide (it is slightly greater near the anode). This is thought to have a negligible effect on device operation but since it is known to exist then a conservative design approach will dictate an even number of diode sections.

Further details of another use of an even number of diodes are given in co-pending application no. GB0019772.3 relating to an electro-optic device for controlling the phase shift between first and second waveguide channels, filed on Aug. 11, 2000.

FIGS. 7–10 relate to carrier induced losses, or attenuation, but similar curves would be expected for change in refractive index as this is similarly dependent on the number or density of charge carriers within the waveguide.

Figure 5:
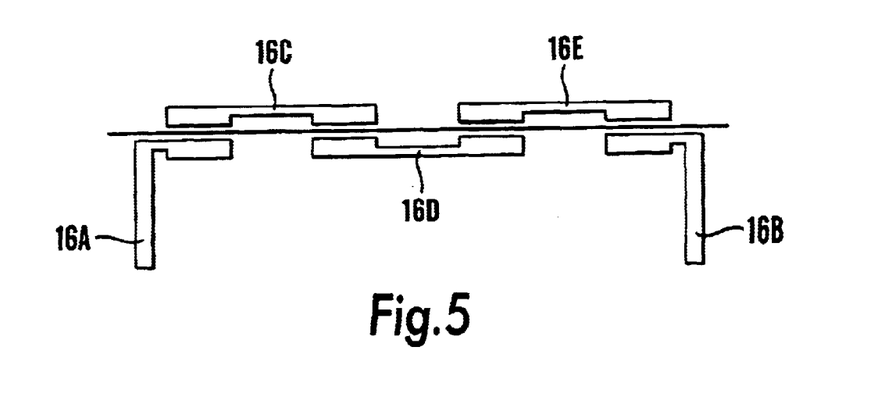
FIG. 5 is a plan view of electrical contacts for the device shown in FIG. 4.

As mentioned above, the doped areas on each side of the waveguide preferably alternate between p and n doped and the doped areas opposite each other across the waveguide are preferably of opposite type, as shown in FIG. 4. With such an arrangement, the electrical signal to be applied to the device can be provided between a p-doped area 15A at one end of the device and an n-doped area 15D at the other end of the device, the doped areas in between being electrically connected, as shown in FIG. 5, to provide an electrical path between these two areas. Thus, doped area 15A may be connected to the anode and doped area 15D connected to the cathode, with doped area 14A electrically connected to 14B, area 15B connected to 15C and area 14C connected to 14D. This may be achieved by a pattern of conductors 16 arranged as shown in FIG. 5, which may be formed from a metallisation layer, e.g. of aluminium, gold or a titanium/tungsten/gold alloy. The plurality of diodes formed by the doped areas are thus connected in series.

Figure 6:
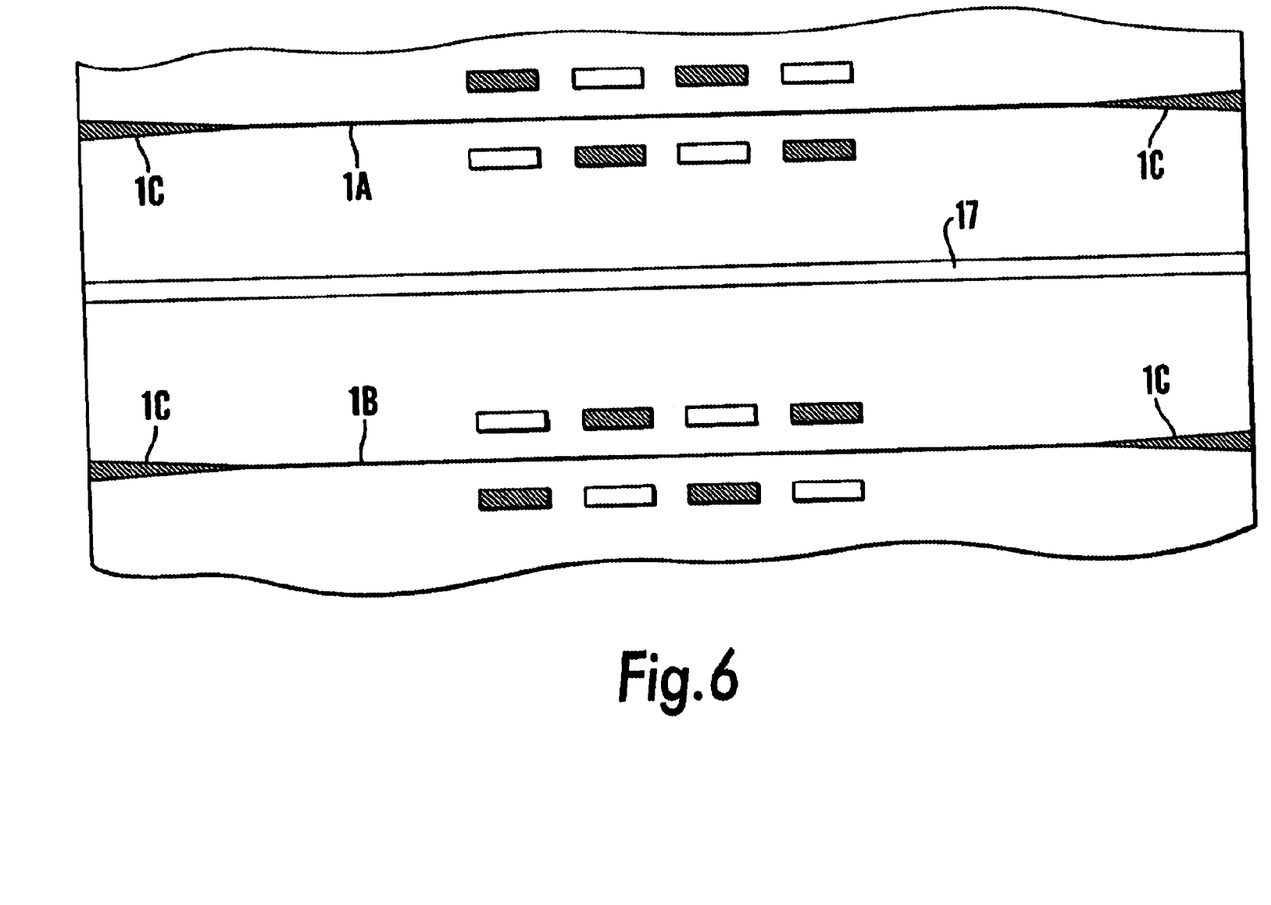
FIG. 6 is a plan view of an attenuator comprising two waveguides each with a device formed therein as shown in FIG. 4.

FIG. 6 shows an attenuator comprising two waveguides 1A, 1B each of which is provided with a device of the type described above. The waveguides 1A, 1B extend across the chip and are provided with widened sections 1C at their ends to facilitate optical coupling with optical fibres (not shown).

These widened sections may comprise tapered waveguides such as those described in WO 98/35250. An isolation device 17 is preferably provided between the waveguides 1A, 1B to electrically and optically isolate them from each other. Further waveguides (not shown) with similar attenuator devices may be provided on the same chip.

As mentioned above, the device may also be used in applications which make use of the refractive index change caused by the charge carriers within the waveguide. It is known, for instance, to use p-i-n diodes in phase modulators, Mach-Zehnder interferometers, couplers and multiplexers. The use of doped regions comprising a plurality of doped areas spaced apart from each other along the length of the waveguide in such applications provides an increase in the change of refractive index per unit current applied compared to a conventional device. The increase in efficiency may be relatively small but when multiple devices are provided on a chip (some devices may for instance comprise 40 or more Mach-Zehnder interferometers on a chip) the improvement becomes more significant.

Figure 11:
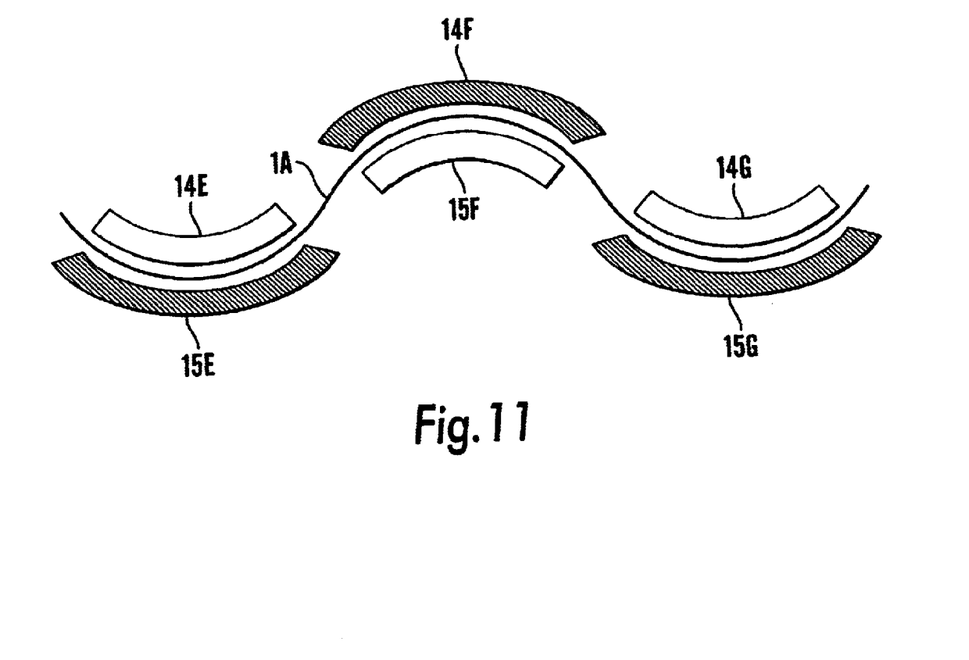
FIG. 11 is a plan view of a device similar to that of FIG. 4 but formed on a curved waveguide.

The device may also be used on curved waveguides, e.g. as shown in FIG. 11. The device shown in FIG. 11 is similar to that shown in FIG. 4, apart from the use of a curved waveguide 1A (and the example shown comprises only three diodes) and similar considerations apply to this embodiment. Such a device may comprise one or more curved portions of a waveguide. FIG. 11 shows a series of three curves bending in alternating directions.

An additional advantage of using a curved waveguide is that attenuation of light by the free charge carriers is somewhat dependent on wavelength, i.e. longer wavelengths are attenuated more than shorter wavelengths.

Figure 12:
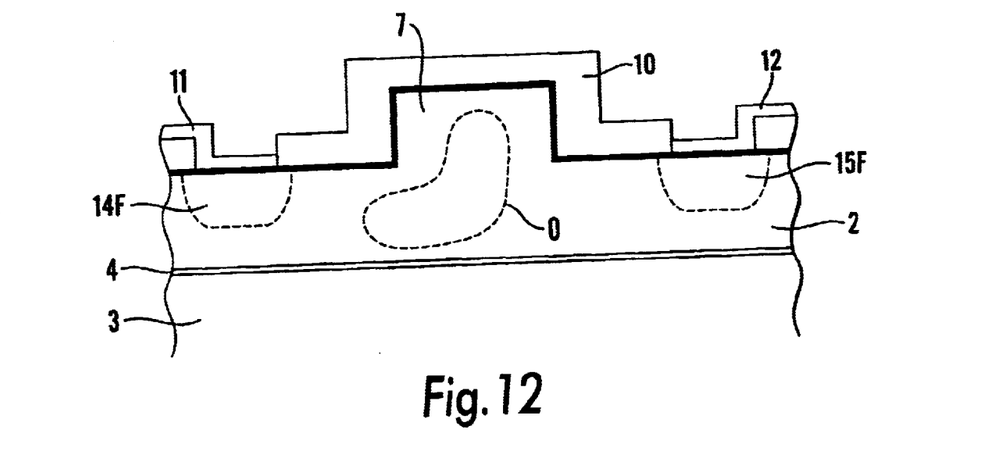
FIG. 12 is a schematic cross-sectional view of a curved rib waveguide showing how the optical mode moves off centre towards the outer side of the curve.

The concentration of free charge carriers is not uniform across the waveguide and is greatest at the side nearest to the p-doped regions so, if the optical mode can be moved off centre, i.e. nearer to that side of the waveguide, this leads to a greater interaction between the optical mode and the free charge carriers. This occurs when an optical mode travels along a curved waveguide as the mode O moves off-centre towards the outer side of the curve as illustrated in FIG. 12. Furthermore, this effect is also wavelength dependent in that longer wavelengths move off centre more than shorter wavelengths. Thus, if the device is arranged so that the greater concentration of charge carriers is on the inner side of the bend, i.e. with the p-doped regions adjacent the inside of the bends, the longer wavelengths of light which travel more on the outer side of the bend interact with a lower concentration of free charge carriers than the shorter wavelengths so counteracting the wavelength dependency of the attenuation of different wavelengths. Accordingly, with an appropriately designed device, the attenuation of different wavelengths can be made more uniform and less wavelength dependent.

To provide the necessary compensation to achieve a substantially uniform attenuation for the different wavelengths, it may be necessary for the light to travel round more than one curve. The device shown in FIG. 11 comprises a series of three curves curving in alternating directions. If two or more curves are used, it is clearly appropriate to provide diodes across each bend with alternating polarity, so the p-doped region is always on the outside of the bend as shown in FIG. 11. A device of the type described above with a plurality of spaced-apart doped areas of alternating polarity along the length of the waveguide is thus ideally suited to such an arrangement.

In an alternative arrangement (not shown), the diode formed across each curve (whether there be one or more curves) may comprise a plurality of spaced-apart doped area along the length of the curve to increase the efficiency of the attenuator (as described above), although in this case all the doped areas on one side of the curve would be of the same type (i.e. p-type on the inside of the curve and n-type on the outside of the curve), rather than being formed as diodes of alternating polarity.

The change of refractive index caused by free charge carriers is also wavelength dependent, i.e. there is a greater change of refractive index for longer wavelengths. Diodes formed across curved waveguides can therefore be used in a similar way to reduce the wavelength dependency of devices making use of the change in refractive index, e.g. phase modulators, Mach-Zehnder interferometers, etc.

Although the example described above uses rib waveguides in a silicon-on-insulator chip, it will be realised that a similar arrangement may be used with other types of waveguide and other types of chip.

The above example refers to the formation of p-i-n diodes across the waveguide but it will be appreciated that devices can be formed with other components comprising doped areas on either side of the waveguide.

What is claimed is:

1. An electro-optic device comprising:
a substrate;
an integrated optical waveguide extending across the substrate; and means arranged to apply an electrical signal across the waveguide via two doped regions to alter attenuation properties and/or a refractive index of the waveguide by altering the density of charge carriers within the waveguide, the two doped regions each comprising a plurality of doped areas spaced apart from each other in a direction parallel to the length of the waveguide the size and spacing of the doped areas being selected so that the efficiency of the device, in terms of the increase in attenuation or change in refractive index per unit current applied thereto, is increased, wherein the device is an adjustable attenuator.

2. The electro-optic device as claimed in claim 1, wherein the spacing between adjacent doped areas is in the range of 250 to 300 microns.

3. The electro-optic device as claimed in claim 1, wherein each of the doped areas has a length in a direction along the waveguide of at least 1 mm.

4. The electro-optic device as claimed in claim 1, wherein each of the doped areas has a length in a direction along the waveguide of 10 mm or less.

5. The electro-optic device as claimed in claim 1, wherein the doped regions each comprise at least four doped areas spaced part from each other in a direction parallel to the length of the waveguide.

6. The electro-optic device as claimed in claim 1, wherein the doped areas form p-i-n diodes across the waveguide.

7. The electro-optic device as claimed in claim 6, wherein the doped areas are arranged in an alternating sequence of p-doped areas and n-doped areas in a direction parallel to the length of the waveguide.

8. The electro-optic device a claimed in claim 1, wherein the waveguide comprises silicon.

9. The electro-optic device as claimed in claim 8, wherein the waveguide is a silicon rib waveguide.

10. The electro-optic device as claimed in claim 1, wherein the two doped regions are provided on opposite sides of the waveguide.

11. The electro-optic device as claimed in claim 10, wherein the two doped regions are provided in areas of silicon adjacent the rib waveguide.

12. The electro-optic device as claimed in claim 1, wherein the waveguide has a substantially straight portion and the two doped regions are arranged so that the density of charge carriers can be altered within said substantially straight portion of the waveguide.

13. The electro-optic device as claimed in claim 1, wherein the doped areas are electrically connected so a plurality of diodes formed thereby are connected in series.

14. The electro-optic device as claimed in claim 1, wherein electrical connections to and/or between the doped areas are provided by metallizations.

15. The electro-optic device as claimed in claim 1, wherein the device is used as a phase modulator.

16. An electro-optic device comprising:

a substrate; and an integrated optical waveguide extending across the substrate, wherein the waveguide comprises a series of two or more curved portions curving in alternating directions, each having an n-doped region adjacent an outer side of the curved portions and a p-doped region adjacent an inner side of the curved portion so as to form a series of diodes of alternating polarity along the length of the waveguide.

* * * * *